United States Patent
Lagmanson

(10) Patent No.: US 11,113,896 B2
(45) Date of Patent: Sep. 7, 2021

(54) GEOPHYSICAL SENSOR POSITIONING SYSTEM

(71) Applicant: ADVANCED GEOSCIENCES, INC., Austin, TX (US)

(72) Inventor: Markus Lagmanson, Austin, TX (US)

(73) Assignee: Advanced Geosciences, Inc., Austin, TX (US)

( * ) Notice: Subject to any disclaimer, the term of this patent is extended or adjusted under 35 U.S.C. 154(b) by 0 days.

(21) Appl. No.: 17/247,030

(22) Filed: Nov. 24, 2020

(65) Prior Publication Data
US 2021/0082203 A1 Mar. 18, 2021

Related U.S. Application Data

(63) Continuation of application No. 16/131,200, filed on Sep. 14, 2018, now Pat. No. 10,846,933.

(51) Int. Cl.
| | |
|---|---|
| *G06T 19/00* | (2011.01) |
| *G06T 7/70* | (2017.01) |
| *G01V 15/00* | (2006.01) |
| *G06T 7/20* | (2017.01) |
| *G06K 9/00* | (2006.01) |

(52) U.S. Cl.
CPC .............. *G06T 19/006* (2013.01); *G06T 7/70* (2017.01); *G01V 15/00* (2013.01); *G06K 9/00671* (2013.01); *G06T 7/20* (2013.01); *G06T 2219/004* (2013.01)

(58) Field of Classification Search
CPC ........... G06T 19/006; G06T 7/70; G06T 7/73; G06T 2219/004; G06T 7/20; G06T 19/00; G01V 15/00; G06K 9/6278; G06K 9/6273; G08K 9/0671
See application file for complete search history.

(56) References Cited

U.S. PATENT DOCUMENTS

| | | | |
|---|---|---|---|
| 2010/0208033 A1 | 8/2010 | Edge et al. | |
| 2011/0279446 A1* | 11/2011 | Castro | G06T 15/20 345/419 |

(Continued)

FOREIGN PATENT DOCUMENTS

EP 2560145 A2 2/2013

OTHER PUBLICATIONS

International Search Report and Written Opinion issued in Application No. PCT/US 2019/051110 dated Dec. 19, 2019; 8 pgs.

*Primary Examiner* — Xilin Guo
(74) *Attorney, Agent, or Firm* — Haynes and Boone, LLP

(57) ABSTRACT

An augmented reality (AR) object positioning system receives a target coordinate for a location of interest within a physical environment. The AR object positioning system then determines an AR device coordinate of an AR device within the physical environment and orientation information of the AR device at the AR device coordinate. The AR object positioning system calculates a plurality of image frame coordinates of an image frame based on the AR device coordinate and the orientation information when the image frame was captured. The AR object positioning system, in response to an image frame coordinate of the plurality of image frame coordinates corresponding with the target coordinate, renders on a display of the AR device, first annotation content relative to the image frame coordinate according to rendering instructions for the first annotation content.

20 Claims, 8 Drawing Sheets

(56) References Cited

U.S. PATENT DOCUMENTS

| | | |
|---|---|---|
| 2013/0147836 A1 | 6/2013 | Small et al. |
| 2015/0077592 A1* | 3/2015 | Fahey .................. H04N 5/2224 348/239 |
| 2016/0205385 A1 | 7/2016 | Sibley |
| 2016/0240011 A1* | 8/2016 | Fedosov ................. G06F 3/011 |

* cited by examiner

GEOPHYSICAL SENSOR POSITIONING SYSTEM

CROSS-REFERENCE TO RELATED APPLICATIONS

This application is a continuation application of U.S. patent application Ser. No. 16/131,200 filed Sep. 14, 2018, issuing as U.S. Pat. No. 10,846,933, incorporated herein by reference in its entirety.

FIELD OF THE DISCLOSURE

This disclosure relates generally to geophysical sensors, and, more particularly, to positioning geophysical sensors using augmented reality.

BACKGROUND

Various geophysical applications utilize electrical surveys to determine a sub-ground resistivity distribution by making electrical measurements on the ground. From such measurements, the resistivity of the sub-ground may be estimated and related to various geological parameters such as mineral and fluid content, porosity, and water saturation.

Resistivity measurements are typically made by applying current directly into the ground using a pair of transmitting electrodes. Resulting potential differences may then be measured directly using several other receiving electrodes. The receiving electrodes are typically arranged in an array or grid.

Positioning of electrodes and/or other sensors for geophysical applications is very important. Well positioned sensors may be used for generating accurate computer models of the sub-ground as well as locating targets for drilling or excavation once the computer models have been generated. Conventional positioning of sensors often requires surveying equipment, tape measures, and/or a very accurate global positioning system (GPS). A technician can use this equipment to accurately position the electrodes on the ground. However, these systems require specialized knowledge, are difficult to maneuver and use in the field, expensive, and/or do not produce the position accuracy needed to generate accurate computer models of the sub-ground using the geophysical sensors. For example, tape measures are time consuming to deploy and inaccurate due to stretching and contracting caused by the ambient temperature. GPS by itself is only accurate to a couple of meters. Differential GPS is accurate but very expensive and requires specialized knowledge. Land surveying using a theodolite is accurate but requires professional knowledge, is time consuming, and bulky to move around on terrain.

SUMMARY

Systems and methods have been provided for positioning objects in an environment using augmented reality. An augmented reality device may be used to find locations of interest in a physical environment and position objects at that the location of interest. Annotation content may be rendered on a display screen of the augmented reality device that shows a user where target coordinates within the physical environment are located. The augmented reality device may also be used to capture location information of objects already positioned in the physical environment. The systems and methods described herein provide more user friendly, less expensive, and/or less complex object positioning systems than compared to conventional surveying equipment and global positioning systems used to position objects such as geophysical sensors in a physical environment.

In various embodiments of the methods and systems disclosed herein, a method of positioning an object in a physical environment includes: receiving a target coordinate for a location of interest within a physical environment; determining an augmented reality device coordinate within the physical environment of an augmented reality device; determining orientation information of the augmented reality device at the augmented reality device coordinate; calculating a plurality of image frame coordinates of an image frame based on the augmented reality device coordinate and the orientation information when the image frame was captured; and in response to an image frame coordinate of the plurality of image frame coordinates corresponding with the target coordinate, rendering, on a display of the augmented reality device, first annotation content relative to the image frame coordinate according to rendering instructions for the first annotation content.

In some embodiments, the method includes in response to the plurality of image frame coordinates not corresponding with the target coordinate, rendering, on the display of the augmented reality device, second annotation content according to rendering instructions for the second annotation content.

In some embodiments of the method, the second annotation content indicates a direction the augmented reality device should move such that a subsequent image frame includes an image frame coordinate that corresponds with the target coordinate.

In some embodiments, the method includes: detecting an object in the image frame that is associated with the target coordinate; tracking an object coordinate of the object in the physical environment; and rendering third annotation content on the display of the augmented reality device based on the object coordinate.

In some embodiments of the method, the rendering the third annotation content on the display of the augmented reality device based on the object coordinate includes updating the first annotation content to the third annotation content when the object coordinate corresponds with the target coordinate. In some embodiments of the method, the object is a geophysical sensor.

In some embodiments of the method, the orientation information includes a direction the augmented reality device is facing with respect to a magnetic field of the physical environment, a distance the augmented reality device is from a surface of the physical environment, and an angle at which the augmented reality device is oriented with respect to the surface of the physical environment. In some embodiments of the method, the augmented reality device coordinate is determined using a positioning system that provides sub-meter accuracy.

In some embodiments, the method includes: detecting an augmented reality event; and capturing the image frame, by an imaging sensor, in response to the detecting the augmented reality event.

In various embodiments of the methods and systems disclosed herein, an augmented reality object positioning system includes: a processor; and a computer-readable medium storing instructions which, when executed by the processor, cause the processor to perform operations comprising: receiving a target coordinate for a location of interest within a physical environment; determining an augmented reality device coordinate within the physical environment of an augmented reality device; determining orientation information of the augmented reality device at the augmented reality device coordinate; calculating a plurality of image frame coordinates of an image frame based on the augmented reality device coordinate and the orientation information when the image frame was captured; and in response to an image frame coordinate of the plurality of image frame coordinates corresponding with the target coordinate, rendering, on a display of the augmented reality device, first annotation content relative to the image frame coordinate according to rendering instructions for the first annotation content.

In various embodiments, the operations further include: in response to the plurality of image frame coordinates not corresponding with the target coordinate, rendering, on the display of the augmented reality device, second annotation content according to rendering instructions for the second annotation content. In various embodiments, the operations further include: detecting an object in the image frame that is associated with the target coordinate; tracking an object coordinate of the object in the physical environment; and rendering third annotation content on the display of the augmented reality device based on the object coordinate.

In various embodiment of the augmented reality object positioning system, the rendering the third annotation content on the display of the augmented reality device based on the object coordinate includes updating the first annotation content to the third annotation content when the object coordinate corresponds with the target coordinate. In various embodiment of the augmented reality object positioning system, the orientation information includes a direction the augmented reality device is facing with respect to a magnetic field of the physical environment, a distance the augmented reality device is from a surface of the physical environment, and an angle at which the augmented reality device is oriented with respect to the surface of the physical environment.

In various embodiments of the methods and systems disclosed herein, a method of capturing a position of an object in a physical environment, includes: identifying an object of interest in an image frame of a physical environment; determining an augmented reality device coordinate within a physical environment of an augmented reality device when the image frame was captured by the augmented reality device; determining orientation information of the augmented reality device at the augmented reality device coordinate when the image frame was captured; determining object coordinates of the object of interest within the image frame based on the augmented reality device coordinate and the orientation information of the augmented reality device; and store the object coordinates in a storage device.

In various embodiments, the method includes: associating feature points of the object of interest with the object coordinates in the storage device. In some embodiments, the method includes rendering, on a display of the augmented reality device, first annotation content relative to the object of interest according to rendering instructions for the first annotation content.

In various embodiments of the method, the identifying the object of interest in the image frame of the physical environment includes receiving a user input defining the object of interest in the image frame. In various embodiments of the method, the identifying the object of interest in the image frame of the physical environment includes performing object recognition on objects provided in the image frame. In various embodiments of the method, the orientation information includes a direction the augmented reality device is facing with respect to a magnetic field of the physical environment, a distance the augmented reality device is from a surface of the physical environment, and an angle at which the augmented reality device is oriented with respect to the surface of the physical environment.

Figure 1A:
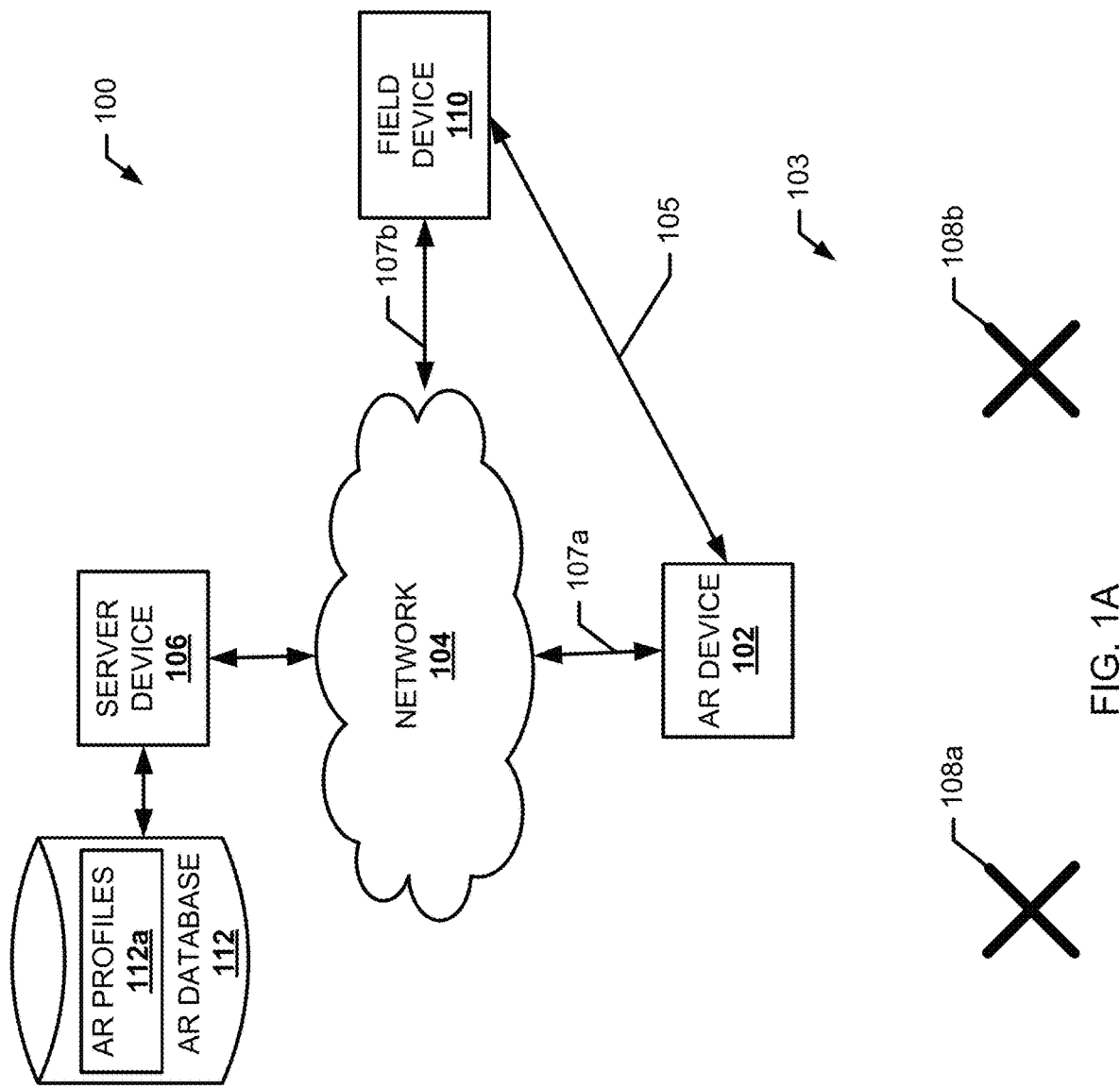
FIG. 1A is a schematic view illustrating an embodiment of an augmented reality object positioning system.

Embodiments of the present disclosure may be understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure include augmented reality object positioning systems and methods that may be used, for example, to position and/or locate geophysical sensors on a ground of a physical environment. As discussed above, existing geophysical sensor positioning systems require specialized knowledge, are difficult to maneuver and use in the field, expensive, and/or do not produce the position accuracy needed to generate accurate computer models of the sub-ground using the geophysical sensors. The present disclosure proposes an augmented reality object positioning system that allows a user to position geophysical sensors without the drawbacks of conventional geophysical sensor positioning systems. Augmented reality enhances the physical world by creating virtual annotations to augment one's perception of reality. It has found applications in various areas, such as training, communication, entertainment, education, driving-safety, and healthcare. As a result in recent advances of augmented reality devices (e.g., Microsoft® HoloLens) and development of augmented reality applications for use with personal devices such as mobile phones and tablet computing devices, as well as development of communication technologies (e.g., 5G and 802.11ac/ad), AR applications will likely become ubiquitous and be widely adopted by consumers and businesses.

The systems and methods of the present disclosure provide for augmented reality object positioning of an object at target coordinates on a surface of a physical environment that are associated with a location of interest. An augmented reality device may use orientation information from motion sensors and augmented reality device coordinates determined from a positioning system to determine image frame coordinates within a captured image of the physical environment. The augmented reality device may compare the image frame coordinates with target coordinates where an object, such as a geophysical sensor, is to be placed. Annotation content may be rendered on the image frame, which is displayed on a display device of the augmented reality device. The annotation content may direct a user of the augmented reality device to the target coordinate of the location of interest. Furthermore, the augmented reality device may track the object that is to be placed at the target coordinates and render annotation content that indicates to the user when the object is positioned at the target coordinate.

The systems and methods of the present disclosure also provide for augmented reality position capture of an object within a physical environment. The augmented reality device may identify an object of interest in the physical environment. The augmented reality device may identify the object via object recognition techniques and/or via user inputs identifying an object as an object of interest. Using orientation information and the augmented reality device coordinates, the augmented reality device may determine object coordinates of the object of interest in a captured image frame. Annotation content may be rendered on a display device that assists a user in capturing the position of the object. A user may store the object coordinates as target coordinates, which may be used in calculation of electrical surveys as described above.

Referring now to FIG. 1A, an embodiment of an augmented reality object positioning system 100 is illustrated. In the illustrated embodiment, the augmented reality object positioning system 100 includes an augmented reality device 102 provided in a physical environment 103. The physical environment 103 may be any indoor and/or outdoor space that may be contiguous or non-contiguous. For example, the physical environment may include a yard, a park, a stadium, a field, a mine site, and/or other spaces. The physical environment 103 may be defined by geofencing techniques that may include specific geographic coordinates such as latitude, longitude, and/or altitude, and/or operate within a range defined by a wireless communication signal. The physical environment 103 may include a plurality of locations of interest (LOI) such as a LOI 108a and a LOI 108b. The LOIs 108a and 108b may be locations where a geophysical sensor and/or other object is needed to be positioned for generating accurate computer models of a subground of the physical environment 103. While the augmented reality object positioning system 100 is described as positioning geophysical sensors in the physical environment 103, one skill in the art in possession of the present disclosure would recognize that the augmented reality object positioning systems and methods described herein may be used for other uses and objects such as, for example, construction, surveying, mapping, shipping, and/or other industries requiring positioning of an object in a physical environment.

In various embodiments, the augmented reality device 102 is described as mobile computing devices such as laptop/notebook computing devices, tablet computing devices, mobile phones, and wearable computing devices. However, in other embodiments, the augmented reality device 102 may be provided by desktop computing devices, server computing devices, and/or a variety of other computing devices that would be apparent to one of skill in the art in possession of the present disclosure. The augmented reality device 102 may include communication units having one or more transceivers to enable augmented reality device 102 to communicate with field devices (e.g., field device 110), other augmented reality devices, and/or a server device 106. The field device 110 may include a positioning system such as, for example, a base station of a real-time kinematic (RTK) global positioning system (GPS) or a base station of a differential GPS that may be used with the augmented reality device 102 to obtain accurate and precise positioning. Accordingly and as disclosed in further detail below, the augmented reality device 102 may be in communication with the field device 110 directly or indirectly. As used herein, the phrase "in communication," including variances thereof, encompasses direct communication and/or indirect communication through one or more intermediary components and does not require direct physical (e.g., wired and/or wireless) communication and/or constant communication, but rather additionally includes selective communication at periodic or aperiodic intervals, as well as one-time events.

For example, the augmented reality device 102 and/or the field device 110 in the augmented reality object positioning system 100 of FIG. 1A may include first (e.g., long-range) transceiver(s) to permit the augmented reality device 102 and/or the field device 110 to communicate with a network 104 via a communication channel 107a and a communication channel 107b, respectively. The network 104 may be implemented by an example mobile cellular network, such as a long term evolution (LTE) network or other third generation (3G), fourth generation (4G) wireless network, or fifth-generation (5G) wireless network. However, in some examples, the network 104 may be additionally or alternatively be implemented by one or more other communication networks, such as, but not limited to, a satellite communication network, a microwave radio network, and/or other communication networks.

The augmented reality device 102 and the field device 110 additionally may include second (e.g., short-range) transceiver(s) to permit augmented reality device 102 to communicate with a field device 110 via a communication channel 105. In the illustrated examples of FIGS. 1A and 1B, such second transceivers are implemented by a type of transceiver supporting short-range (i.e., operate at distances that are shorter than the long range transceivers) wireless networking. For example, such second transceivers may be implemented by Wi-Fi transceivers (e.g., via a Wi-Fi Direct protocol), Bluetooth® transceivers, infrared (IR) transceiver, and other transceivers that are configured to allow the augmented reality device 102 and/or the field device 110 to intercommunicate via an ad-hoc or other wireless network.

The augmented reality object positioning system 100 also includes or may be in connection with a server device 106. For example, the server device 106 may include one or more server devices, storage systems, cloud computing systems, and/or other computing devices (e.g., desktop computing device(s), laptop/notebook computing device(s), tablet computing device(s), mobile phone(s), etc.). As discussed below, the server device 106 may be coupled to a network augmented reality database 112 that is configured to provide repositories such as an augmented reality repository of augmented reality profiles 112a for various LOI within the physical environment 103. For example, the network augmented reality database 112 may include a plurality of augmented reality profiles 112a that each includes a location identifier (e.g., a target coordinate), annotation content, rendering instructions, object recognition data, as well as any other information for providing annotation content to a display of the physical environment 103. While not illustrated in FIG. 1A, the augmented reality device 102 may be coupled to one or more local augmented reality databases that may include at least a portion of the augmented reality profiles 112a stored in the network augmented reality database 112.

Figure 1B:
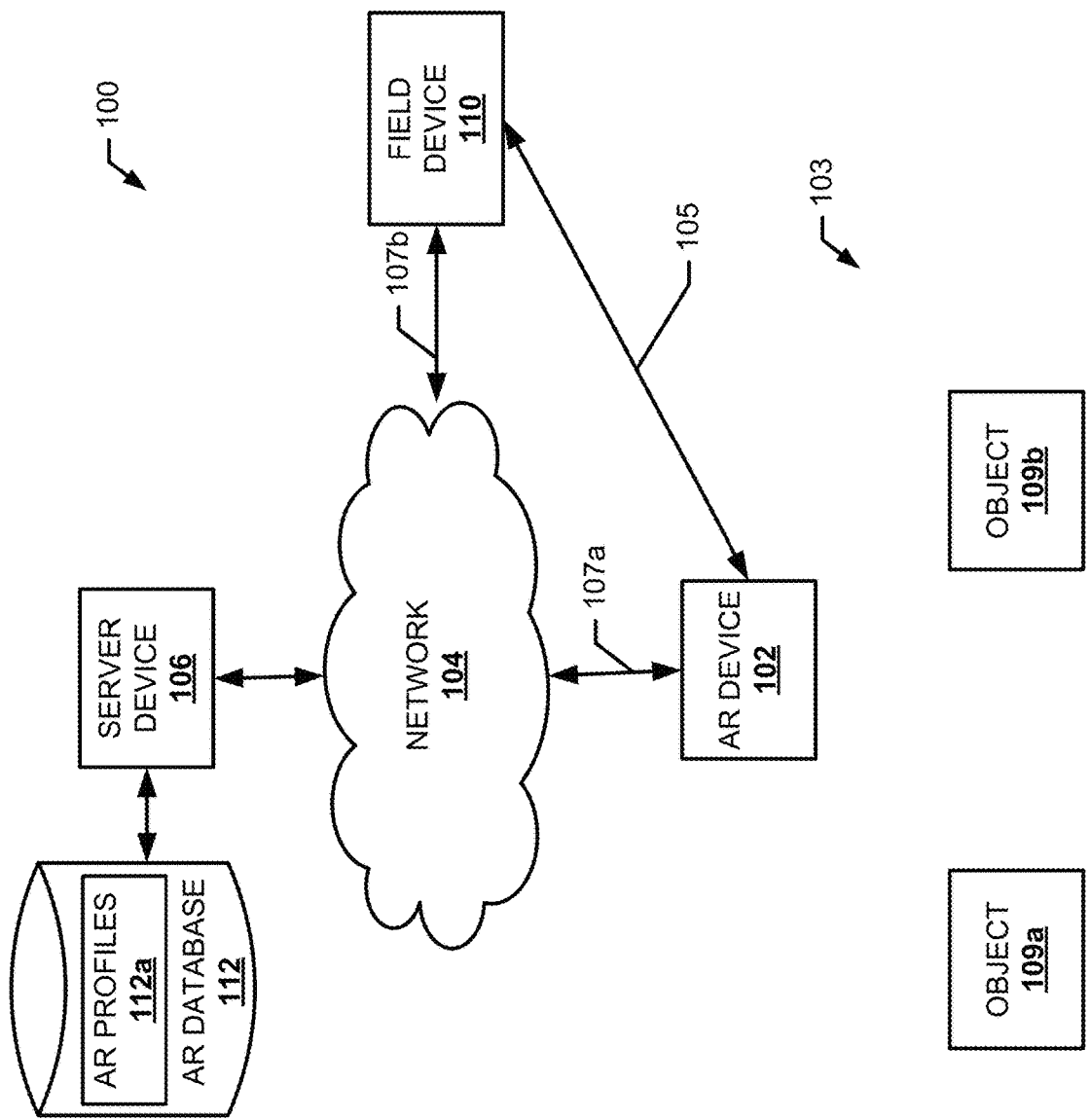
FIG. 1B is a schematic view illustrating an embodiment of an augmented reality object positioning system.

Referring now to FIG. 1B, an embodiment of the augmented reality object positioning system 100 of FIG. 1A is illustrated. However, the augmented reality object positioning system 100 of FIG. 1B includes object(s) (e.g., an object 109a and an object 109b) already positioned in the physical environment 103. The objects 109a and/or 109b may include a geophysical sensor such as, for example, a transmitting electrode and/or a receiving electrode used in electrical surveying for generating computer models of the sub-ground of the physical environment. In other examples, the geophysical sensor may include a geophone, a magnetic sensor, a ground penetrating radar antenna, a transmitter loop used in induced magnetic field measurements, a receiver loop used in induced magnetic field measurements, a temperature sensor, an Internet of Things (IoT) sensor, and/or other geophysical sensors that would be apparent to one of skill in the art in possession of the present disclosure. However, in other examples, the objects 109a and/or 109b may include markers, pins, devices, tools, structures, and/or other object where the position of that object may be a LOI. The augmented reality object positioning system 100 of FIG. 1B may be configured to capture the position of the objects 109a and/or 109b within physical environment 103, as discussed below, and store the position information as a LOI in the network augmented reality database 112. While the augmented reality object positioning system 100 in FIGS. 1A and 1B is illustrated as including a network 104, a field device 110, a server 106, and an augmented reality database 112, one of skill in the art in possession of the present disclosure will recognize that these components are optional and the methods described herein may be performed by the augmented reality 102 alone.

Figure 2:
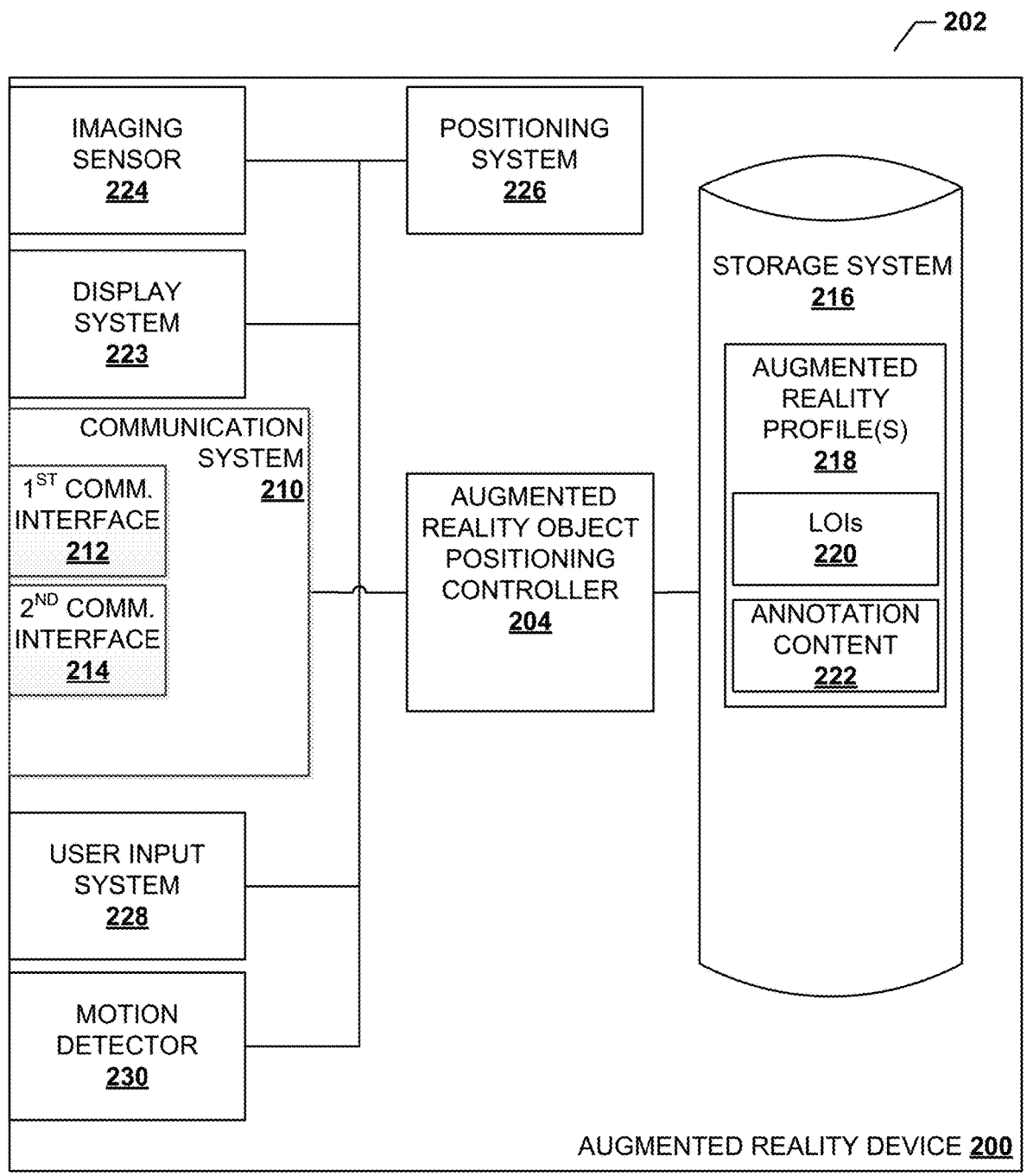
FIG. 2 is a schematic view illustrating an embodiment of an augmented reality device used in the augmented reality object positioning system of FIGS. 1A and 1B.

Referring now to FIG. 2, an embodiment of an augmented reality device 200 is illustrated that may be the augmented reality device 102 discussed above with reference to FIG. 1, and which may be provided by a mobile computing device such as a laptop/notebook computing device, a tablet computing device, a mobile phone, and a wearable computing device. In the illustrated embodiment, the augmented reality device 200 includes a chassis 202 that houses the components of the augmented reality device 200. Several of these components are illustrated in FIG. 2. For example, the chassis 202 may house a processing system (not illustrated) and a non-transitory memory system (not illustrated) that includes instructions that, when executed by the processing system, cause the processing system to provide an augmented reality object positioning controller 204 that is configured to perform the functions of the augmented reality object positioning controller and/or the augmented reality devices discussed below.

The chassis 202 may further house a communication system 210 that is coupled to augmented reality object positioning controller 204 (e.g., via a coupling between the communication system 210 and the processing system). The communication system 210 may include software or instructions that are stored on a computer-readable medium and that allow the augmented reality device 200 to send and receive information through the communication networks discussed above. For example, the communication system 210 may include a first communication interface 212 to provide for communications through the communication network 104 as detailed above (e.g., first (e.g., long-range) transceiver(s)). In an embodiment, the first communication interface 212 may be a wireless antenna that is configured to provide communications with IEEE 802.11 protocols (Wi-Fi), cellular communications, satellite communications, other microwave radio communications and/or communications. The communication system 210 may also include a second communication interface 214 that is configured to provide direct communication with other user devices, sensors, storage devices, and other devices within the physical environment 103 discussed above with respect to FIGS. 1A and 1B (e.g., second (e.g., short-range) transceiver(s)). For example, the second communication interface 214 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The chassis 202 may house a storage device (not illustrated) that provides a storage system 216 that is coupled to the augmented reality object positioning controller 204 through the processing system. The storage system 216 may be configured to store augmented reality profiles 218 in one or more augmented reality repositories. The augmented reality profiles 218 may include LOIs 220 and annotation content 222. For example, the LOIs 220 may include a coordinates such longitude, latitude, altitude, and/or any other location information. The annotation content 222 may include a two-dimensional image, a three-dimensional images, text, an audio file, a video file, a link to a website, an interactive annotation, and/or any other visual and/or auditory annotations that may be superimposed on and/or near a LOI(s) that the annotation content 222 is associated with in the physical environment 103 being reproduced on a display screen included on a display system 223 of the augmented reality device 200. The annotation content 222 may also include rendering instructions that provide instructions to the user device 200 as to how the augmented reality device 200 is to display the annotation content via the display system 223. In various embodiments, the augmented reality profiles 218 may include object recognition data such as feature points used to recognize objects within the physical environment 103. In addition, the storage system 216 may include at least one application that provides instruction to the augmented reality object positioning controller 204 when providing annotation content on a display system 223.

The chassis 202 may also house an imaging sensor 224 (e.g., a two-dimensional image capturing camera, a three-dimensional image capturing camera, an infrared image capturing camera, a depth capturing camera, similar video recorders, and/or a variety of other image or data capturing devices). The imaging sensor 224 may be a camera and/or any other sensor device that may be used to gather visual information from the physical environment surrounding the augmented reality device 200, for use in recognizing an object in the physical environment 103, and other functionality with the augmented reality device 200.

The chassis 202 may also include a positioning system 226 that is coupled to the augmented reality object positioning controller 204. The positioning system 226 may include sensors for determining the location and position of the augmented reality device 200 in the physical environment. For example the positioning system 226 may include a global positioning system (GPS) receiver, a real-time kinematic (RTK) GPS receiver, a differential GPS receiver, a Wi-Fi based positioning system (WPS) receiver, an accelerometer, and/or other positioning systems and components.

In various embodiments, the chassis 202 also houses an user input subsystem 228 that is coupled to the augmented reality object positioning controller 204 (e.g., via a coupling between the processing system and the user input subsystem 228). In an embodiment, the user input subsystem 228 may be provided by a keyboard input subsystem, a mouse input subsystem, a track pad input subsystem, a touch input display subsystem, and/or any other input subsystem. The chassis 202 also houses a display system 223 that is coupled to the augmented reality object positioning controller 204 (e.g., via a coupling between the processing system and the display system 223). In an embodiment, the display system 223 may be provided by a display device that is integrated into the augmented reality device 200 and that includes a display screen (e.g., a display screen on a laptop/notebook computing device, a tablet computing device, a mobile phone, or wearable device), or by a display device that is coupled directly to the augmented reality device 200 (e.g., a display device coupled to a desktop computing device by a cabled or wireless connection). The chassis 202 may also house a motion detector 230 that is coupled to the augmented reality object positioning controller 204. The motion detector 230 may include an accelerometer, a gyroscope, a compass, and/or any other sensor for detecting and/or calculating the orientation and/or movement of the augmented reality device 200.

Figure 3:
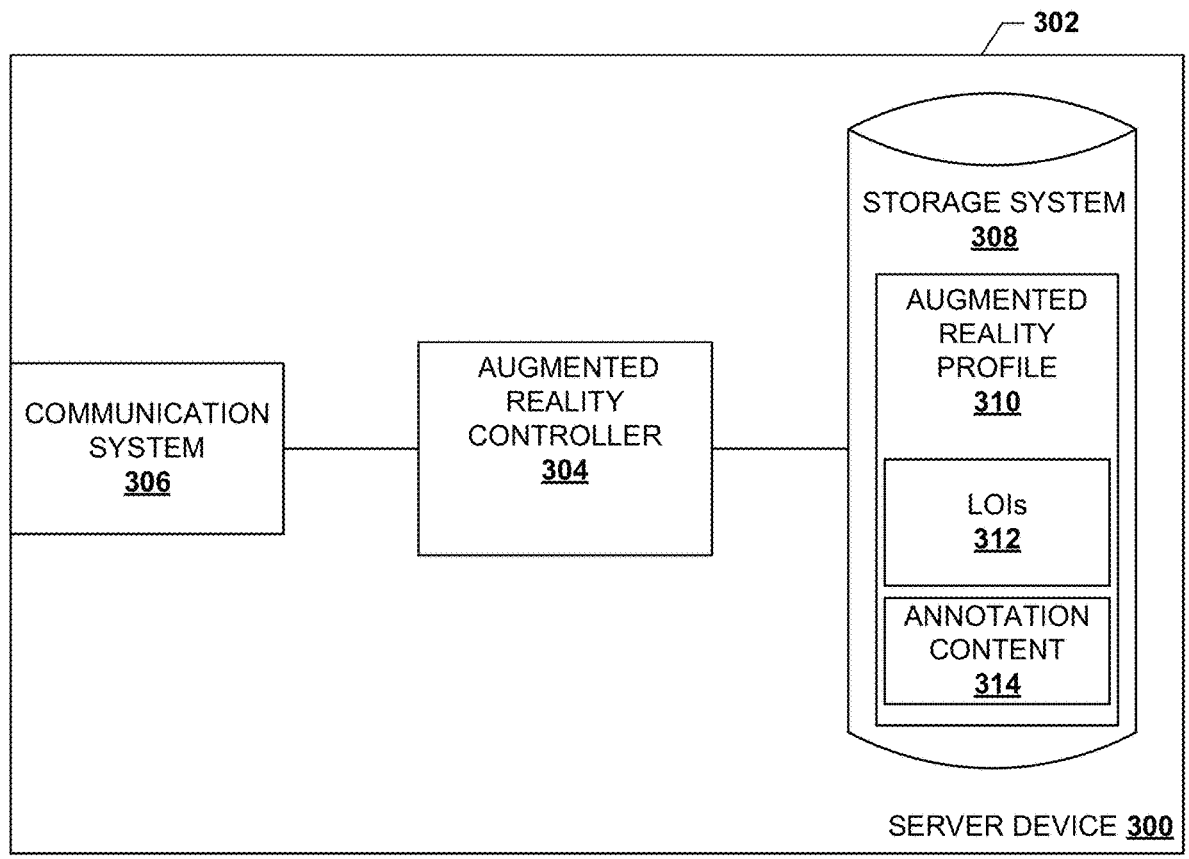
FIG. 3 is a schematic view illustrating an embodiment of a server device used in the augmented reality object positioning system of FIG. 1A and FIG. 1B.

Referring now to FIG. 3, an embodiment of a server device 300 is illustrated that may be the server device 106 discussed above with reference to FIG. 1. In the illustrated embodiment, the server device 300 includes a chassis 302 that houses the components of the server device 300, only some of which are illustrated in FIG. 3. For example, the chassis 302 may house a processing system (not illustrated) and a non-transitory memory system (not illustrated) that includes instructions that, when executed by the processing system, cause the processing system to provide an augmented reality controller 304 that is configured to perform the functions of the augmented reality controller and/or server devices discussed below. In the specific example illustrated in FIG. 3, the augmented reality controller 304 may be configured to perform at least a portion of the augmented reality functionality described herein such that resources on the augmented reality device 102 may be freed to perform other functionality.

The chassis 302 may further house a communication system 306 that is coupled to the augmented reality controller 304 (e.g., via a coupling between the communication system 306 and the processing system) and that is configured to provide for communication through the network 104 as detailed below. The communication system 306 may allow the server device 300 to send and receive information over the network 104 of FIG. 1. The chassis 302 may also house a storage device (not illustrated) that provides a storage system 308 that is coupled to the augmented reality controller 304 through the processing system. The storage system 308 may be configured to store augmented reality profiles 310 in one or more augmented reality repositories. The augmented reality profiles 310 may include LOIs 312 and annotation content 314. For example, the LOIs 220 may include a coordinates such longitude, latitude, altitude, and/or any other location information. The annotation content 314 may include a two-dimensional image, a three-dimensional image, text, an audio file, a video file, a link to a website, an interactive annotation, and/or any other visual and/or auditory annotations that may be superimposed on and/or near a location in the physical environment 103 being reproduced on a display screen of an augmented reality device 102. The annotation content 314 may also include instructions (e.g., a pose of the annotation) on how a user device is to display the annotation content in relation to the LOI that the annotation content is associated with. In various embodiments, the augmented reality profile 310 may include object recognition data such as feature points used to recognize objects within the physical environment 103.

Figure 4:
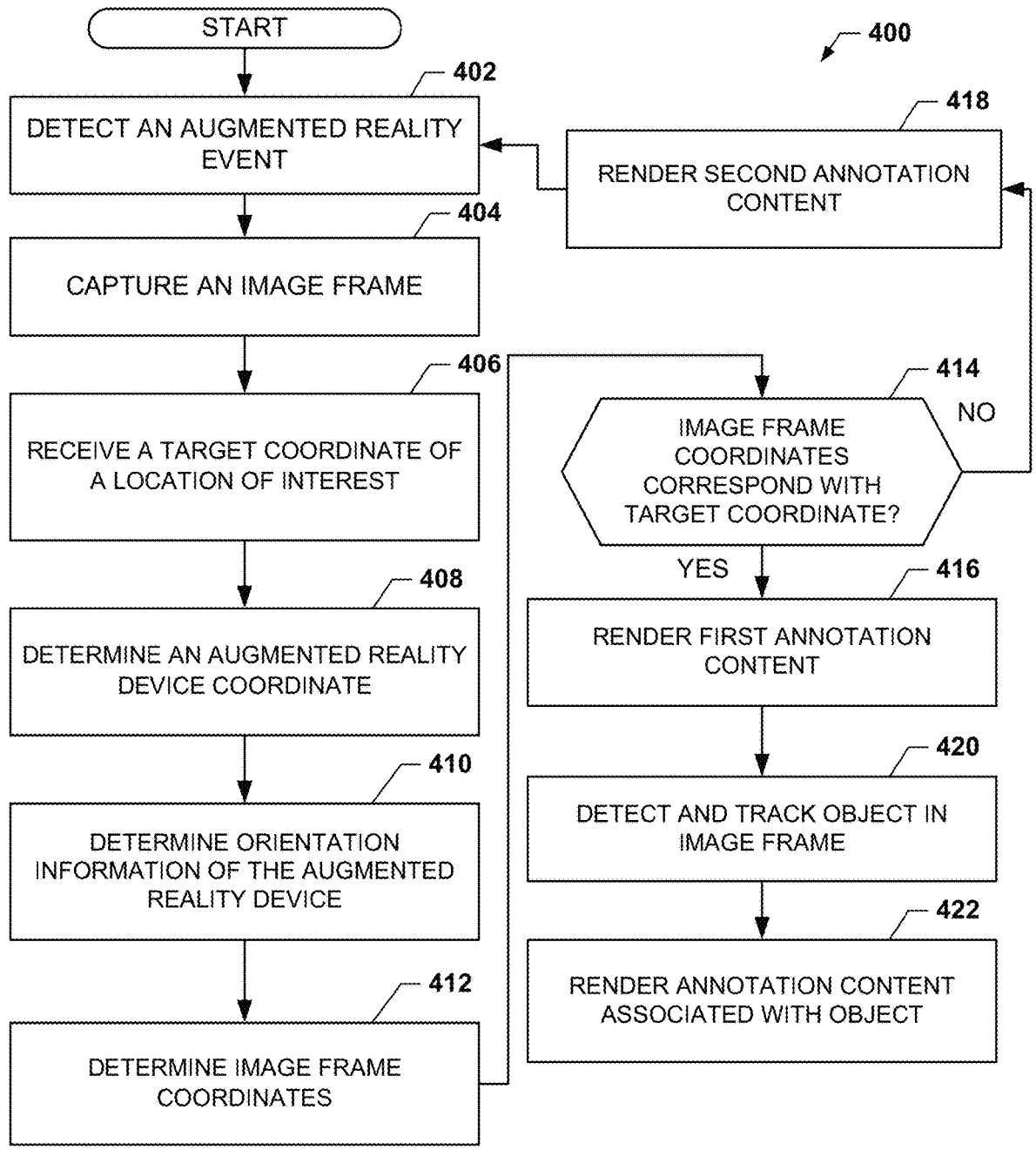
FIG. 4 is a flow chart illustrating an embodiment of a method of positioning an object using augmented reality.

Referring now to FIG. 4, an embodiment of a method 400 of augmented reality object positioning is illustrated. The method 400 will be discussed in reference to the FIGS. 1A, 2 and 3 above. The method 400 begins at block 402 where an augmented reality event is detected. In an embodiment at block 402, the augmented reality object positioning controller 204 may be running an augmented reality application. The augmented reality object positioning controller 204 may be monitoring for an input that indicates that an augmented reality event has occurred. For example, the augmented reality object positioning controller 204 may monitor motion detector inputs provided by the motion detector 230. The augmented reality object positioning controller 204 may be monitoring the physical environment 103 and/or the motion of the augmented reality device 200 within a user's hand to determine whether the user intends to project annotation content inside a current image frame captured by the imaging sensor 224 and provided the image frame and the annotation content on a display device provided by the display system 223. By basing the augmented reality event on motion, the augmented reality object positioning controller 204 can trigger annotation content by avoiding specific user commands such as screen touch or voice input, which provides a seamless user experience. For example, the augmented reality object positioning controller 204 may be monitoring for predetermined thresholds of steadiness of the augmented reality device 200 and/or a vertical orientation of the augmented reality device 200. While the specific example of the augmented reality event monitoring describes monitoring for motion detector inputs, one of skill in the art in possession of the present disclosure will recognize that the augmented reality object positioning controller 204 may be monitoring for other inputs such as a user voice command, a touch input, an image input to trigger object recognition, and/or any other user input or input from the physical environment 103.

The method 400 then proceeds to block 404 in response to the augmented reality device detecting an augmented reality event in block 402. In an embodiment of block 404, an image frame or a series of image frames is captured. In an embodiment of block 404, the imaging sensor 224 may capture one or more image frames, such as a series of image frames, of the physical environment 103 and provide the one or more image frames as an image input to the augmented reality object positioning controller 204 and/or 304. In various embodiments, the one or more image frames may include one or more objects (e.g., objects 109a and/or 109b) from the physical environment 103. For example, a camera may capture an image frame as the image input and provide that image frame to the augmented reality object positioning controller 204 and/or 304 as the image frame.

The method 400 then proceeds to block 406 where a target coordinate for a location of interest is received. In an embodiment of block 406, the augmented reality object positioning controller 204 and/or 304 may receive a coordinate for one or more locations of interest (e.g., LOI 108a and/or LOI 108b). The LOIs 108a and/or 108b may be locations for positioning an object and each defined by a target coordinate. The target coordinate may include location information such as longitude, latitude, altitude, and/or any other location information. For example, the augmented reality device 102 and/or the server device 106 may process a data file that is provided to and/or generated by the augmented reality device 102 and/or the server device 106 that includes a plan to position a plurality of geophysical sensors within the physical environment 103. Each geophysical sensor may be assigned a target coordinate at which the geophysical sensor is to be positioned when used to perform an electrical survey of a sub-ground of the physical environment 103.

The method 400 then proceeds to block 408 where an augmented reality device coordinate is determined. In an embodiment of block 408, the augmented reality object positioning controller 204 and/or 304 may receive an augmented reality device coordinate that indicates a position of the augmented reality device 102 within the physical environment 103. The augmented reality device coordinate may include location information such as, for example, longitude, latitude, altitude, and/or any other location information. In various embodiments, the positioning system 226 may provide the augmented reality device coordinate. As discussed above the positioning system 226 may include a global positioning system (GPS) receiver, a real-time kinematic (RTK) GPS receiver, a differential GPS receiver, a Wi-Fi based positioning system (WPS) receiver, and/or other positioning systems and components. In various embodiments, the positioning system 226 may operate in conjunction with the field device 110 which may provide components of the global positioning system (GPS) receiver, the real-time kinematic (RTK) GPS receiver, the differential GPS receiver, the Wi-Fi based positioning system (WPS) receiver. For example, the field device 110 may include a reference station of a fixed, known position for RTK GPS and/or differential GPS. The augmented reality device coordinate may be calculated using the positioning system 226 and/or the field device 110 with sub-meter accuracy. However, in various embodiments, the positioning system 226 and/or the field device 110 may be selected to provide sub-decimeter or sub-centimeter accuracy.

In various embodiments, the location of the augmented reality device 102 may be determined using a simultaneous localization and mapping (SLAM) algorithm that is provided by the augmented reality object positioning controller 204 and/or 304. A SLAM algorithm may update a map of the physical environment 103 while simultaneously keeping track of a location augmented reality device 102 within the physical environment 103. The SLAM algorithm may find a local coordinate of the augmented reality device 102 relative to a physical marker in the physical environment such that objects can be positioned or locations of already placed objects can be determined relative to that physical marker. For example, a SLAM algorithm such as sparse tracking, inertial measurements, and depth measurements by way of radar and lidar (e.g., Light Detection And Ranging), and/or other orientation information may be used to determine local position of the augmented reality device 102. Thus, the augmented reality device 102 may not require a positioning system 226 (e.g., a GPS, an RTK GPS) when determining coordinates of the augmented reality device 102.

The method 400 then proceeds to block 410 where an orientation of the augmented reality device in three-dimensional space is determined. In an embodiment, the augmented reality object positioning controller 204 and/or 304 may receive orientation information from the motion detector 230. As discussed above, the motion detector 230 may include an accelerometer, a gyroscope, an altimeter, a compass, and/or any other sensor for detecting and/or calculating the orientation and/or movement of the augmented reality device 200. The motion detector 230 may provide orientation information such as the distance the augmented reality device 200 is from the ground of the physical environment 103, an angle that the augmented reality device 200 is in relation to the ground of the physical environment 103, a direction at which the augmented reality device 200 is facing in relation to a magnetic field of the physical environment 103, and/or a direction the augmented reality device 200 is positioned in relation to gravity.

The method 400 then proceeds to block 412 where image frame coordinates of the physical environment within the image frame are determined. In an embodiment of block 412, the augmented reality object positioning controller 204 and/or 304 may calculate coordinates of the physical environment 103 that are within the image frame. For example, when an image frame of the physical environment 103 is captured by the imaging sensor 224, the augmented reality device coordinates and the orientation information may be associated with the image frame at the time the image frame was captured. Based on the angle of the imaging sensor 224 and/or the augmented reality device 200 and the distance between the ground and the imaging sensor 224 and/or the augmented reality device 200, the augmented reality object positioning controller 204 may determine the horizontal distance between the augmented reality device 200 and points on the ground of the physical environment 103 that are provided in the image frame. Based on the horizontal distance, the augmented reality device coordinates of the augmented reality device 200, and the direction at which the imaging sensors 224 and/or the augmented reality device 200 is pointing when the image frame is captured, the augmented reality object positioning controller 204 may determine image frame coordinates which may include the coordinates of the physical environment 103 that are in the image frame. However, in other embodiments, depth cameras and/or 3D scanning cameras may be used in conjunction with the augmented reality device coordinates to determine image frame coordinates.

The method 400 may then proceed to decision block 414 where a determination is made as to whether any of the image frame coordinates correspond with a target coordinate of a location of interest. In an embodiment of decision block 414, the augmented reality object positioning controller 204 and/or 304 may determine whether any of the image frame coordinates correspond with any of the target coordinates of the LOIs 220 and/or 312. The augmented reality object positioning controller 204 and/or 304 may be searching for a specific LOI 220 and/or 312 at a given time or may be searching for any LOI 220 and/or 312 that is in the plan. The augmented reality object positioning controller 204 and/or 304 may retrieve the target coordinates associated with the LOI 220 and/or 312 from the storage system 216 and/or 312 respectively If a target coordinate of the LOIs 220 and/or 312 corresponds with an image frame coordinate, then the method 400 may proceed to block 416 where annotation content for the target coordinate of the LOI may be rendered relative to the image frame coordinate that corresponds with the target coordinate according to rendering instructions provided with the annotation content. In an embodiment of block 416, the augmented reality object positioning controller 204 and/or 304 may retrieve annotation content 222 and/or 314 from the storage system 216 and/or 308 that is associated with the LOI 220 and/or 312 that corresponds with the image frame coordinate. The annotation content 222 and/or 314 may include rendering instructions that define how the annotation content 222 and/or 314 is to be rendered in relation to the image frame coordinate recognized. The augmented reality object positioning controller 204 and/or 304 may augment the image frame coordinate in the image frame and subsequent image frames with the annotation content 222 and/or 314 and provide the augmented image frame with the annotation content 222 and/or 314 to the display system 223 of the augmented reality device 200 for display on a display screen of the display system 223. The augmented reality object positioning controller 204 and/or 304 may calculate a pose of the annotation content 222 and/or 314 for rendering and may include a three-dimensional graphics engine to render the annotation content 222 and/or 314 in a three-dimensional space to align the annotation content 222 and/or 314 to the image frame coordinate in each image frame according to the rendering instructions provided with the annotation content 222 and/or 314 and/or rendering instructions included with the augmented reality object positioning controller 204 and/or 304. For example, the annotation content 222 and/or 314 may include a graphic element such as a bouncing pin, an arrow, a sphere, a bull's-eye, and/or some other visual cue at the image frame coordinate on the ground that corresponds with the target coordinate of the physical environment 103. In other embodiments, the annotation content 222 and/or 314 rendered may include instructions such as a type of object to be placed at the target coordinates, the target coordinates, directions to the target coordinate, and/or any other annotation content that may be apparent to one of skill in the art in possession of the present disclosure. The augmented reality object positioning controller 204 and/or 304 may also render the annotation content 222 and/or 314 according to user inputs provided by the user of the augmented reality device 200 via the user input system 228. For example, the user may provide touch inputs to a touchscreen display system and the augmented reality object positioning controller 204 and/or 304 may modify the annotation content 222 and/or 314 according to those rendering instruction provided by the touch inputs.

In various embodiments, the image frame may include a picture of the physical environment 103, a video of the physical environment 103, other annotation content or representations of the physical environment 103 such that the annotation content 222 and/or 314 may be provided on/in an animation, on a tessellated surface, on a surface of a tessellated three-dimensional volume, on a point cloud with xyz coordinates, and/or other representations of the physical environment 103 that would be apparent to one of skill in the art in possession of the present disclosure.

Figure 5:
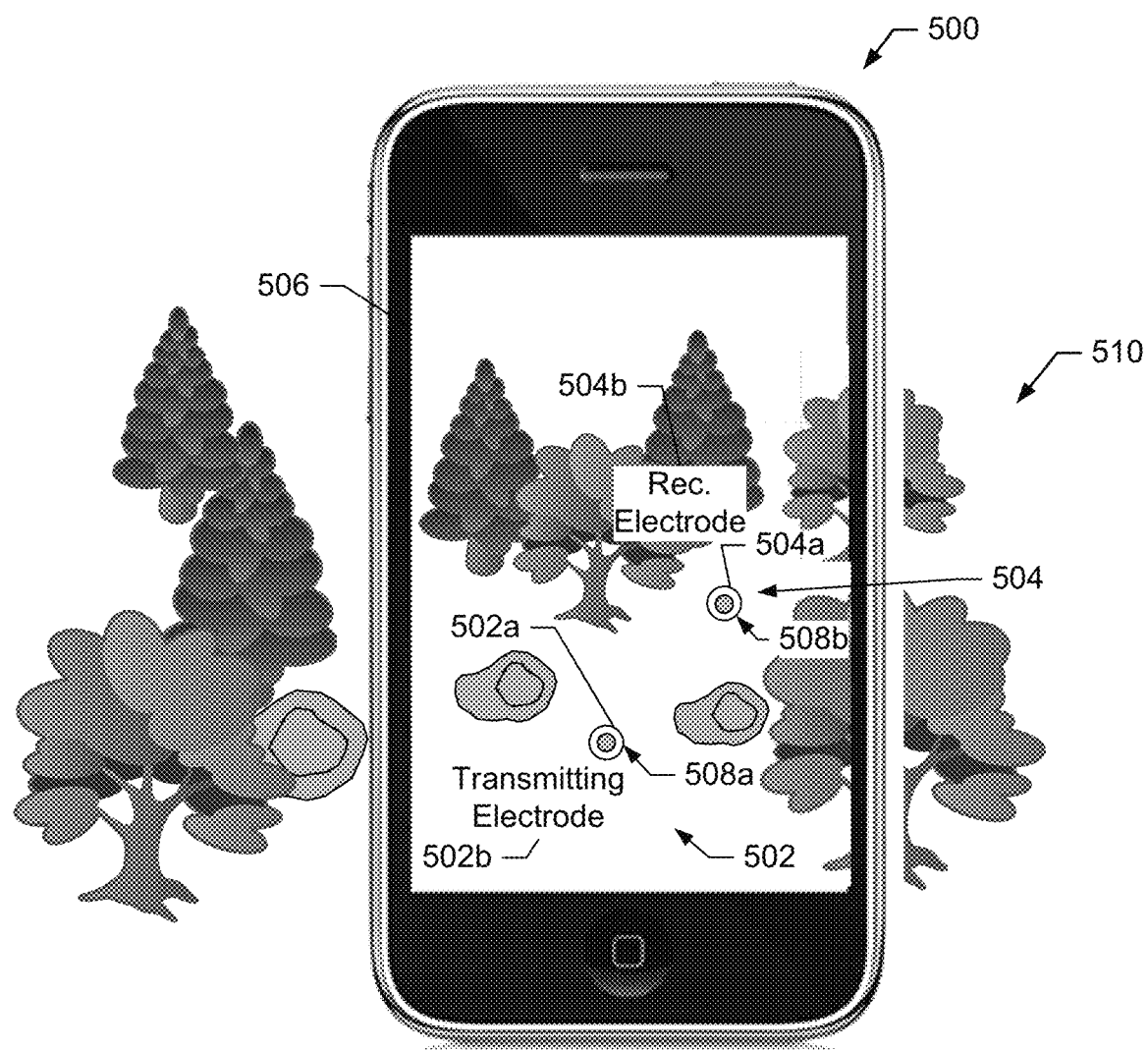
FIG. 5 is a screenshot of an embodiment of an augmented reality device displaying annotation content indicating a position of a location of interest in a physical environment.

Referring now to FIG. 5, a screenshot of a specific example of the method 400 for positioning objects using augmented reality is illustrated. FIG. 5 illustrates an augmented reality device 500, which may be any of the augmented reality devices 102/200 described above. The augmented reality object positioning controller 204 of the augmented reality device 500 and/or the augmented reality controller 304 in communication with the augmented reality device 500 may render annotation content 502 and annotation content 504 on a display screen 506 of the augmented reality device 500. The annotation content 502 may include a graphic element such as the bull's-eye 502a and a notification 502b. The bull's-eye 502a marks an LOI 508a within the physical environment 510 that is associated with a target coordinate. The annotation content 502 may include the notification 502b which may communicate to the user of the augmented reality device 500 the object that is to be placed at the LOI 508a. For example, a transmitting electrode may need to be placed at the LOI 508a. The annotation content 504 may include a graphic element such as the bull's-eye 504a and a notification 504b. The bull's-eye 504a marks an LOI 508b within the physical environment 510 that is associated with a target coordinate. The annotation content 504 may include the notification 504b which may communicate to the user of the augmented reality device 500 the object that is to be placed at the LOI 508b. For example, a receiving electrode may need to be placed at the LOI 508b.

If, at decision block 414, a target coordinate of the LOIs 220 and/or 312 does not correspond with an image frame coordinate, then the method 400 may proceed to block 418 where annotation content may be rendered that indicates how the user of the augmented reality device should move within the environment such that a target coordinate of an LOI 220 and/or 312 is within a field of view of the imaging sensor 224. In an embodiment of block 418, the augmented reality object positioning controller 204 and/or 304 may retrieve annotation content 222 and/or 314 from the storage system 216 and/or 308 that is to be displayed when the image frame coordinates do not correspond with a target coordinate. The annotation content 222 and/or 314 may include rendering instructions that define how the annotation content 222 and/or 314 is to be rendered in relation to the image frame. The augmented reality object positioning controller 204 and/or 304 may augment the image frame and subsequent image frames with the annotation content 222 and/or 314 and provide the augmented image frame with the annotation content 222 and/or 314 to the display system 223 of the augmented reality device 200 for display on a display screen of the display system 223. The augmented reality object positioning controller 204 and/or 304 may calculate a pose of the annotation content 222 and/or 314 for rendering and may include a three-dimensional graphics engine to render the annotation content 222 and/or 314 in a three-dimensional space to align the annotation content 222 and/or 314 to the image frame in each frame according to the rendering instructions provided with the annotation content 222 and/or 314 and/or rendering instructions included with the augmented reality object positioning controller 204 and/or 304. For example, the annotation content 222 and/or 314 may include a graphic element such as an arrow that points in the direction the augmented reality device 200 needs to move such that the target coordinate of the LOI 220 and/or 312 is within the image frame of the augmented reality device 200. The method 400 may proceed to block 402 after providing the annotation content in block 418 to determine whether image frame coordinates of a subsequent image frame correspond with the target coordinate of the LOI 220 and/or 312.

Referring back to block 416, the method 400 may proceed to block 420 where an object to be positioned at the target coordinate of the location interest is detected and tracked in the image frame. In an embodiment of block 420, the augmented reality object positioning controller 204 and/or 304 may be configured to track an object that is to be positioned at the target coordinate of the LOI 220 and/or 312. In various embodiments, the user of the augmented reality device 200 may place the object within the field of view of the imaging sensor 224. The user may define the object such that the augmented reality object positioning controller 204 and/or 304 can recognize the object and track it by gathering feature points of the object, calculating a pose of the object, and tracking those feature points and pose throughout subsequent image frames. In various embodiments, an object profile may be associated with the location of interest and the augmented reality object positioning controller 204 and/or 304 may be configured to perform object recognition such that when searching for the LOI 220 and/or 312 in the image frame, the augmented reality object positioning controller 204 and/or 304 is identifying objects within the image frame by capturing feature points of those objects and comparing the captured feature points to feature points of the object associated with the LOI 220 and/or 312 to determine whether that object associated with the LOI 220 and/or 312 is within the image frame. If the object associated with the LOI 220 and/or 312 is in the image frame, the augmented reality object positioning controller 204 and/or 304 may track the object and determine object coordinates similarly to how the image frame coordinates were determined above.

The method 400 may continue to block 422 where annotation content is rendered on the image frame that is associated with the object. In an embodiment of block 422, the augmented reality object positioning controller 204 and/or 304 may render annotation content that is associated with the object. For example, the augmented reality object positioning controller 204 and/or 304 may render annotation content when the object coordinates correspond with the target coordinates of the location of interest. The augmented reality object positioning controller 204 and/or 304 may continue to track the object coordinates until the object coordinates are within a predetermined threshold of the target coordinates. For example, if the object coordinates are within a meter, a decimeter, a centimeter, or other threshold of the target coordinates, then the augmented reality object positioning controller 204 and/or 304 may render annotation content 222 that is associated with the condition. For example, and referring to FIG. 5, the bull's-eye 504a may turn from a red colored bull's-eye to a green colored bull's eye when the object is within the predefined threshold. In another example, the notification 504b may change to text stating that the object is at the location of interest such that in the geophysical sensor example the user may fix the geophysical sensor to the ground of the physical environment 103.

Figure 6:
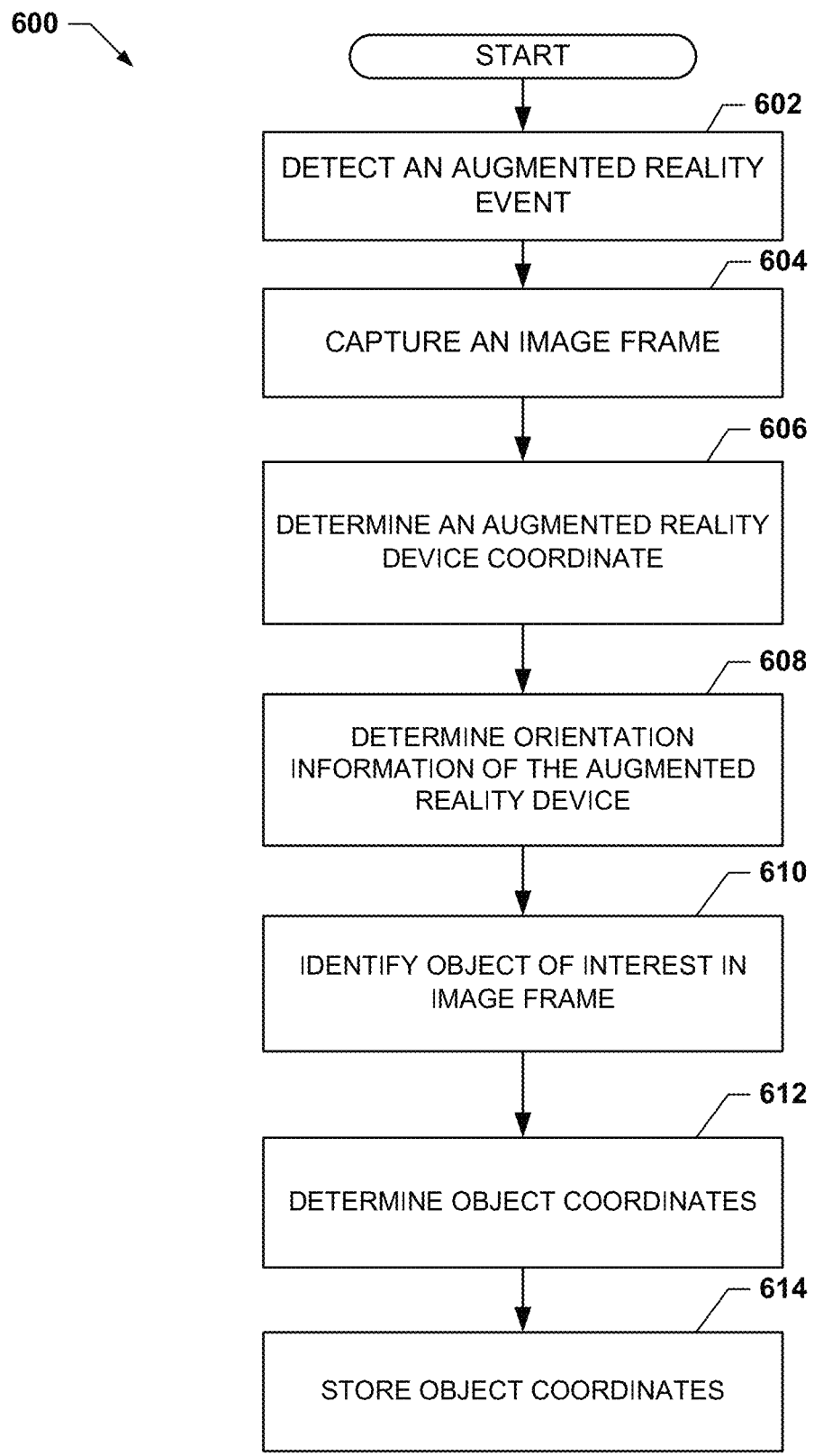
FIG. 6 is a flow chart illustrating an embodiment of a method of determining a position of an object using augmented reality.

Referring now to FIG. 6, an embodiment of a method 600 of augmented reality object position recording is illustrated. The method 600 will be discussed in reference to the FIGS. 1B, 2 and 3 above. The method 600 begins at block 602 where an augmented reality event is detected. In an embodiment at block 602, the augmented reality object positioning controller 204 may be running an augmented reality application. The augmented reality object positioning controller 204 may be monitoring for an input that indicates that an augmented reality event has occurred. For example, the augmented reality object positioning controller 204 may monitor motion detector inputs provided by the motion detector 230. The augmented reality object positioning controller 204 may be monitoring the physical environment 103 and/or the motion of the augmented reality device 200 within a user's hand to determine whether the user intends to render annotation content 222 and/or 314 or perform some other augmented reality task inside a current image frame captured by the imaging sensor 224 and provide the image frame and the annotation content 222 and/or 314 on a display device provided by the display system 223. By basing the augmented reality event on motion, the augmented reality object positioning controller 204 can trigger annotation content by avoiding specific user commands such as screen touch or voice input, which provides a seamless user experience. For example, the augmented reality object positioning controller 204 may be monitoring for predetermined thresholds of steadiness of the augmented reality device 200 and/or a vertical orientation of the augmented reality device 200. While the specific example of the augmented reality event monitoring describes monitoring for motion detector inputs, one of skill in the art in possession of the present disclosure will recognize that the augmented reality object positioning controller 204 may be monitoring for other inputs such as a user voice command, a touch input, an image input to trigger object recognition, and/or any other user input or input from the physical environment 103.

The method 600 then proceeds to block 604 in response to the augmented reality device detecting an augmented reality event in block 602. In an embodiment of block 604, an image frame or a series of image frames is captured. In an embodiment of block 604, the imaging sensor 224 may capture one or more image frame, such as a series of image frames, of the physical environment 103 and provide the one or more image frames as an image input to the augmented reality object positioning controller 204 and/or 304. In various embodiments, the one or more image frames may include one or more objects (e.g., objects 109a and/or 109b) from the physical environment 103. For example, the imaging sensor 224 may capture an image frame as the image input and provide that image frame to the augmented reality object positioning controller 204 and/or 304 as the image frame.

The method 600 then proceeds to block 606 where an augmented reality device coordinate is determined. In an embodiment of block 606, the augmented reality object positioning controller 204 and/or 304 may receive an augmented reality device coordinate that indicates a position of the augmented reality device 102 within the physical environment 103. The augmented reality device coordinate may include location information such as, for example, longitude, latitude, altitude, and/or any other location information. In various embodiments, the positioning system 226 may provide the augmented reality device coordinate. As discussed above the positioning system 226 may include a global positioning system (GPS) receiver, a real-time kinematic (RTK) GPS receiver, a differential GPS receiver, a Wi-Fi based positioning system (WPS) receiver, and/or other positioning systems and components. In various embodiments, the positioning system 226 may operate in conjunction with the field device 110 which may provide components of the global positioning system (GPS) receiver, the real-time kinematic (RTK) GPS receiver, the differential GPS receiver, the Wi-Fi based positioning system (WPS) receiver. For example, the field device 110 may include a reference station of a fixed known position for RTK GPS and/or differential GPS. The augmented reality device coordinate may be calculated using the positioning system 226 and/or the field device 110 with sub-meter accuracy. However, in various embodiments the positioning system 226 and/or the field device 110 may be selected to provide sub-decimeter or sub-centimeter accuracy.

The method 600 then proceeds to block 608 where an orientation of the augmented reality device in three-dimensional space is determined. In an embodiment, the augmented reality object positioning controller 204 and/or 304 may receive orientation information from the motion detector 230. As discussed above, the motion detector 230 may include an accelerometer, a gyroscope, an altimeter, a compass, and/or any other sensor for detecting and/or calculating the orientation and/or movement of the augmented reality device 200. The motion detector 230 may provide orientation information such as the distance the augmented reality device 200 is from the ground of the physical environment 103, an angle that the augmented reality device 200 is in relation to the ground of the physical environment 103, a direction at which the augmented reality device 200 is facing in relation to a magnetic field of the physical environment 103, and/or a direction the augmented reality device 200 is positioned in relation to gravity.

The method 600 may then proceed to block 610 where an object is identified in the image frame as an object whose position is going to be recorded. In an embodiment of block 610, the augmented reality object positioning controller 204 and/or 304 may receive, via the user input system 228, an instruction that defines an object in the image frame as an object whose position is to be captured. For example, the user may select a point on the image frame via a touchscreen that is provided in the display system 223. In other examples, the user may draw an area around the object in the image frame when defining the object. While the object may be identified manually, in various embodiments of block 610, the augmented reality object positioning controller 204 and/or 304 may be configured to perform object recognition on the image frame to identify objects whose positions need to be recorded. For example, the image frame is computationally processed against the augmented reality profile 218 and/or 310 stored in the storage system 216 and/or 308, which may include the object identifiers of the of objects of interest. The augmented reality object positioning controller 204 and/or 304 may have access to the storage system 216 and 308, which may include the annotation content 222 and/or 314 of the augmented reality profiles 218 and/or 310. For example, each object identifier may be associated with respective annotation content 222 and/or 314 such that when an image frame is computationally processed against the object identifiers and there is substantial correspondence between an object in the image frame and an object identifier stored in the local augmented reality database, then the annotation content 222 and/or 314 that is associated with the object identifier is retrieved for rendering as discussed in further detail below. However, in other embodiments no annotation content is associated with the object identifiers and the augmented reality device 200 may be used to capture location information about the object.

In an embodiment, the augmented reality object positioning controller 204 and/or 304 includes an object recognition algorithm to identify objects in the image frame. For example, the object recognition algorithm may include the scale-invariant feature transform (SIFT) algorithm, the speeded up robust features (SURF) algorithm, the oriented FAST (Features from Accelerated Segment Test) and rotated BRIEF (Bianary Robust Independent Elementary Features) (ORB) algorithm, the FAST+Fast Retina Key Point (FREAK) algorithm, the Binary Robust Invariant Scalable Keypoints (BRISK), and/or any other object recognition algorithm.

Using the object recognition algorithm, the augmented reality object positioning controller 204 and/or 304 may detect features (i.e. interest points) in the image frame. For example, the augmented reality object positioning controller 204 and/or 304 may include a feature detector such as FAST, Harris and Stephens/Plessey/Shi-Tomasi, level curve curvature, Laplacian of the Gaussian (LoG), Difference of Gaussians, smallest univalue segment assimilating nucleus (SU-SAN), and/or other feature detectors. Once the features are detected, the augmented reality object positioning controller 204 and/or 304 may extract the features from the image frame to provide the feature descriptors. The augmented reality object positioning controller 204 and/or 304 may encode the feature descriptors into a compact feature representation, (e.g., a Fisher Vector (FV)). The augmented reality object positioning controller 204 and/or 304, then performs feature matching by calculating the distance between the compact feature representation and those (e.g., the object identifiers) in storage systems 216 and/or 308 one by one.

In an embodiment of block 610, the storage system 216 and/or 308 may include augmented reality profiles 218 and/or 310 that may have been generated and stored in the storage systems 216 and/or 308 prior to the method 600. For example, images of the physical environment 103 were taken and objects identified. An offline probabilistic model (e.g., Gaussian Mixture Model) may be built based on the feature points of all images in the storage systems 216 and/or 308. Using this model, the feature descriptors of an image are encoded into a compact representation (e.g., a Fisher Vector). The compact feature representations of the images are stored using a hash function (e.g., Locality Sensitive Hashing, LSH) for faster retrieval. However, in other embodiments, one or more machine learning algorithms to perform supervised machine learning, unsupervised machine learning (e.g., deep belief networks, neural networks, statistical pattern recognition, rule-based artificial intelligence, etc.) semi-supervised learning, reinforcement learning, deep learning, and other machine learning algorithms when updating, creating, and/or reinforcing an augmented reality profiles 218 and/or 310 and/or any other profile stored in the storage systems 216 and/or 308 discussed herein that is updatable over time based on received image frames.

In an embodiment, the augmented reality object positioning controller 204 and/or 304 may determine whether there is substantial correspondence between an object in the image frame and the object identifiers in one or more augmented reality profiles 218 and/or 310. For example, the augmented reality object positioning controller 204 and/or 304, may perform feature matching, as described above, by calculating the distance between the compact feature representation and those (e.g., the object identifiers) in the storage system 216 and/or 308. The objects of the image frame may have substantial correspondence with object identifiers in the augmented reality profiles 218 and/or 310 when a predefined condition is satisfied. For example, the predefined condition may be that one or more compact feature representations of the object match the object identifiers or satisfy a predetermined threshold of similarity (e.g., 50% similar, 60% similar, 70% similar, 80% similar, 85% similar, 90% similar, 95% similar, 99% similar, 100% similar and other thresholds of similarity) with the object identifiers in the augmented reality profile 218 and/or 310. Substantial correspondence may also include situations where unsupervised machined learning techniques (e.g., using cluster analysis), and/or supervised machine learning techniques (e.g., using statistical classification) determines that compact feature representations of the object in one group are more similar to each other than those in other groups.

The method 600 then proceeds to block 612 where object coordinates of the physical environment within the image frame are determined. In an embodiment of block 612, the augmented reality object positioning controller 204 and/or 304 may calculate coordinates of the identified objects (e.g., objects 109a and/or 109b) in physical environment 103 that are within the image frame. For example, when an image frame is captured of the physical environment 103 by the imaging sensor 224 and objects of interest are identified in the image frame by the user or by performing object recognition of objects of interest, the augmented reality device coordinates and the orientation information may be associated with the image frame at the time the image frame was captured. Based on the angle of the imaging sensor 224 and/or the augmented reality device 200 and the distance between the ground and the imaging sensor and/or the augmented reality device 200, the augmented reality object positioning controller 204 and/or 304 may determine the horizontal distance between the augmented reality device 200 and the objects 109a and/or 109b positioned in the physical environment 103 that are provided in the image frame. Based on the horizontal distance, the augmented reality device coordinates of the augmented reality device 200, and the direction at which the imaging sensors 224 and/or the augmented reality device 200 is pointing when the image frame is captured, the augmented reality object positioning controller 204 and/or 304 may determine object coordinates, which may include the coordinates of objects positioned in the physical environment 103 that are in the image frame. The object coordinates may also be determined by triangulation techniques such as capturing the object in image frames when the augmented reality device is at different positions and/or angles.

The method 600 then proceeds to block 614 where object coordinates are stored. In an embodiment of block 614, the augmented reality object positioning controller 204 and/or 304 may store the object coordinates in the storage system 216 and/or 308. In various embodiments, the object coordinates may be associated with feature vectors of the object with the augmented reality profile 218 and/or 310 for that object. In other embodiments, the object coordinates may be designated as LOIs 220 and/or 312 such that if the objects were to be placed again at the position within the physical environment 103 and/or the user of the augmented reality device wanted to easily locate the LOIs 220 and/or 312 after the objects are placed to recover the objects, the augmented reality device 200 may be used according to method 400 to find the LOIs within the physical environment 103 for those objects.

Thus, systems and methods have been provided for object positioning using augmented reality. An augmented reality device may be used to find locations of interest in a physical environment and position objects at that the location of interest. Annotation content may be rendered on a display screen of the augmented reality device that shows a user where target coordinates within the physical environment are located. The augmented reality device may also be used to capture location information of objects already positioned in the physical environment. The systems and methods described herein provide more user friendly, less expensive, and/or less complex object positioning systems than compared to conventional surveying equipment and global positioning systems used to position objects such as geophysical sensors in a physical environment.

Figure 7:
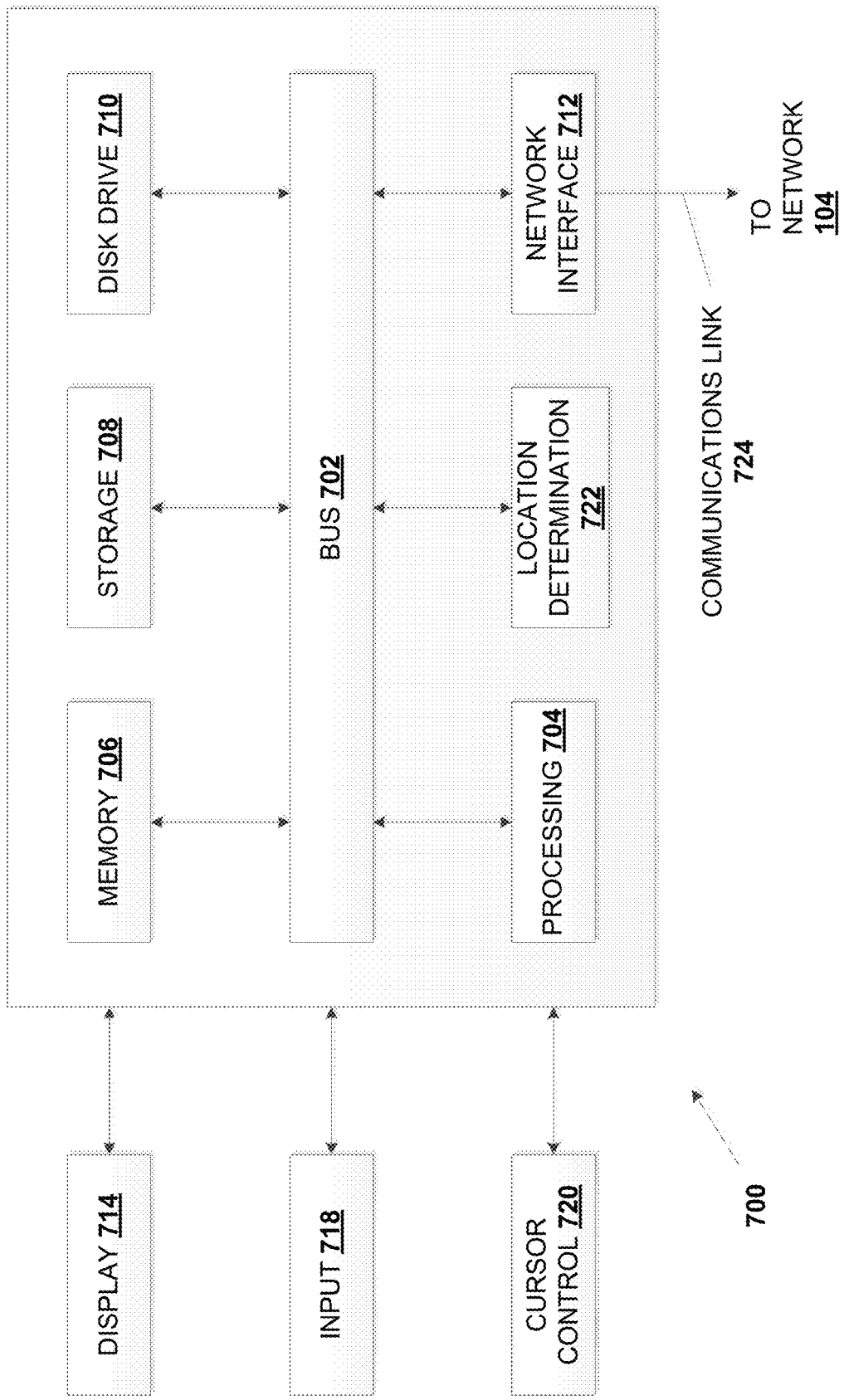
FIG. 7 is a schematic view illustrating an embodiment of a computer system.

Referring now to FIG. 7, an embodiment of a computer system 700 suitable for implementing, for example, the augmented reality devices 102, 200, and 500, field devices 110, and the server devices 106 and 300 is illustrated. It should be appreciated that other devices utilized in the augmented reality object positioning system 100 discussed above may be implemented as the computer system 700 in a manner as follows.

In accordance with various embodiments of the present disclosure, computer system 700, such as a computer and/or a network server, includes a bus 702 or other communication mechanism for communicating information, which interconnects subsystems and components, such as a processing component 704 (e.g., processor, micro-controller, digital signal processor (DSP), etc.), a system memory component 706 (e.g., RAM), a static storage component 708 (e.g., ROM), a disk drive component 710 (e.g., magnetic or optical), a network interface component 712 (e.g., modem or Ethernet card), a display component 714 (e.g., CRT or LCD), an input component 718 (e.g., keyboard, keypad, or virtual keyboard), a cursor control component 720 (e.g., mouse, pointer, or trackball), and/or a location determination component 722 (e.g., a Global Positioning System (GPS) device as illustrated, a cell tower triangulation device, and/or a variety of other location determination devices as described above.) In one implementation, the disk drive component 710 may comprise a database having one or more disk drive components.

In accordance with embodiments of the present disclosure, the computer system 700 performs specific operations by the processing component 704 executing one or more sequences of instructions contained in the system memory component 706, such as described herein with respect to the augmented reality device(s), field equipment, and/or the server device(s). Such instructions may be read into the system memory component 706 from another computer-readable medium, such as the static storage component 708 or the disk drive component 710. In other embodiments, hardwired circuitry may be used in place of or in combination with software instructions to implement the present disclosure.

Logic may be encoded in a computer-readable medium, which may refer to any medium that participates in providing instructions to the processing component 704 for execution. Such a medium may take many forms, including but not limited to, non-volatile media, volatile media, and tangible media employed incident to a transmission. In various embodiments, the computer-readable medium is non-transitory. In various implementations, non-volatile media includes optical or magnetic disks and flash memory, such as the disk drive component 710, volatile media includes dynamic memory, such as the system memory component 706, and tangible media employed incident to a transmission includes coaxial cables, copper wire, and fiber optics, including wires that comprise the bus 702 together with buffer and driver circuits incident thereto.

Some common forms of computer-readable media include, for example, floppy disk, flexible disk, hard disk, magnetic tape, any other magnetic medium, CD-ROM, DVD-ROM, any other optical medium, any other physical medium with patterns of holes, RAM, PROM, EPROM, FLASH-EPROM, any other memory chip or cartridge, cloud storage, or any other medium from which a computer is adapted to read. In various embodiments, the computer-readable media are non-transitory.

In various embodiments of the present disclosure, execution of instruction sequences to practice the present disclosure may be performed by the computer system 700. In various other embodiments of the present disclosure, a plurality of the computer systems 700 coupled by a communication link 724 to the network 104 (e.g., such as a LAN, WLAN, PTSN, and/or various other wired or wireless networks, including telecommunications, mobile, and cellular phone networks) may perform instruction sequences to practice the present disclosure in coordination with one another.

The computer system 700 may transmit and receive messages, data, information and instructions, including one or more programs (e.g., application code) through the communication link 724 and the network interface component 712. The network interface component 712 may include an antenna, either separate or integrated, to enable transmission and reception via the communication link 724. Received program code may be executed by processor 704 as received and/or stored in disk drive component 710 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components, and vice versa.

Software, in accordance with the present disclosure, such as program code or data, may be stored on one or more computer-readable media. It is also contemplated that software identified herein may be implemented using one or more general-purpose or special-purpose computers and/or computer systems, networked and/or otherwise. Where applicable, the ordering of various steps described herein may be changed, combined into composite steps, and/or separated into sub-steps to provide features described herein.

The foregoing is not intended to limit the present disclosure to the precise forms or particular fields of use disclosed. As such, it is contemplated that various alternate embodiments and/or modifications to the present disclosure, whether explicitly described or implied herein, are possible. Persons of ordinary skill in the art in possession of the present disclosure will recognize that changes may be made in form and detail without departing from the scope of what is claimed.

What is claimed is:

1. A method, comprising:
   receiving a target coordinate for a location of interest within a physical environment;
   calculating a plurality of image frame coordinates for an image frame when the image frame was captured based on an augmented reality device coordinate and orientation information of an augmented reality device that captured the image frame;
   in response to an image frame coordinate of the plurality of image frame coordinates corresponding with the target coordinate, rendering, on a display of the augmented reality device, first annotation content relative to the image frame coordinate according to rendering instructions for the first annotation content; and
   rendering second annotation content on the display of the augmented reality device when an object coordinate that includes coordinates of a geophysical sensor is within a predetermined distance from the target coordinate such that the second annotation content indicates when the geophysical sensor is positioned at the target coordinate.

2. The method of claim 1, further comprising:
   performing object recognition on objects within the image frame, wherein the objects within the image frame include the geophysical sensor; and
   determining, based on the object recognition, that the geophysical sensor in the image frame corresponds with a stored geophysical sensor identified in an object profile that is associated with the target coordinate.

3. The method of claim 2, further comprising:
   tracking the geophysical sensor throughout subsequent image frames.

4. The method of claim 1, further comprising:
   receiving user inputs defining the geophysical sensor that is within the image frame; and
   tracking the geophysical sensor throughout subsequent image frames.

5. The method of claim 1, further comprising:
   in response to the plurality of image frame coordinates not corresponding with the target coordinate, rendering, on the display of the augmented reality device, third annotation content according to rendering instructions for the third annotation content.

6. The method of claim 5, wherein the third annotation content indicates a direction the augmented reality device should move such that a subsequent image frame includes an image frame coordinate that corresponds with the target coordinate.

7. The method of claim 1, wherein the rendering the second annotation content on the display of the augmented reality device when the object coordinate is within the predetermined distance from the target coordinate such that the second annotation content indicates when the geophysical sensor is positioned at the target coordinate includes updating the first annotation content to the second annotation content when the object coordinate is within the predetermined distance from the target coordinate.

8. The method of claim 1, wherein the orientation information includes a direction the augmented reality device is facing with respect to a magnetic field of the physical environment, a distance the augmented reality device is from a surface of the physical environment, and an angle at which the augmented reality device is oriented with respect to the surface of the physical environment.

9. The method of claim 1, further comprising:
   detecting an augmented reality event; and
   capturing the image frame, by an imaging sensor coupled to the augmented reality device, in response to the detecting the augmented reality event.

10. The method of claim 1, further comprising:
    receiving a data file that includes a plan to position the geophysical sensor within the physical environment at the target coordinate to perform an electrical survey of a sub-ground of the physical environment, wherein the target coordinate includes a first latitude, a first longitude, and a first altitude of the physical environment and is associated with the geophysical sensor.

11. An augmented reality object positioning system, comprising:
    a processor; and
    a computer-readable medium storing instructions which, when executed by the processor, cause the processor to perform operations comprising:
    identifying a geophysical sensor in an image frame of a physical environment, wherein object coordinates of the geophysical sensor in the physical environment are unknown;
    determining the object coordinates within the physical environment of the geophysical sensor from the image frame based on an augmented reality device coordinate within the physical environment of an augmented reality device and orientation information of the augmented reality device when the image frame was captured by the augmented reality device; and generating a computer model of a sub-ground of the physical environment based on the object coordinates of the geophysical sensor.

12. The system of claim 11, wherein the operations further comprise:

storing the object coordinates of the geophysical sensor in a storage device; and associating feature points of the geophysical sensor with the object coordinates in the storage device.

13. The system of claim 11, wherein the operations further comprise:

rendering, on a display of the augmented reality device, first annotation content relative to the geophysical sensor according to rendering instructions for the first annotation content.

14. The system of claim 11, wherein the operations further comprise:

detecting an augmented reality event, wherein the identifying the geophysical sensor in the image frame of the physical environment is in response to the detecting the augmented reality event wherein the identifying the geophysical sensor in the image frame of the physical environment includes performing object recognition on objects provided in the image frame.

15. A method, comprising:

identifying a geophysical sensor in an image frame of a physical environment, wherein object coordinates of the geophysical sensor in the physical environment are unknown;

determining the object coordinates within the physical environment of the geophysical sensor from the image frame based on an augmented reality device coordinate within the physical environment of an augmented reality device and orientation information of the augmented reality device when the image frame was captured by the augmented reality device; and generating a computer model of a sub-ground of the physical environment based on the object coordinates of the geophysical sensor.

16. The method of claim 15, further comprising:

storing the object coordinates of the geophysical sensor in a storage device; and associating feature points of the geophysical sensor with the object coordinates in the storage device.

17. The method of claim 15, further comprising:

rendering, on a display of the augmented reality device, first annotation content relative to the geophysical sensor according to rendering instructions for the first annotation content.

18. The method of claim 15, wherein the identifying the geophysical sensor in the image frame of the physical environment includes receiving a user input defining the geophysical sensor in the image frame.

19. The method of claim 15, wherein the identifying the geophysical sensor in the image frame of the physical environment includes performing object recognition on objects provided in the image frame.

20. The method of claim 15, wherein the orientation information includes a direction the augmented reality device is facing with respect to a magnetic field of the physical environment, a distance the augmented reality device is from a surface of the physical environment, and an angle at which the augmented reality device is oriented with respect to the surface of the physical environment.

* * * * *